United States Patent
Liu et al.

(10) Patent No.: US 12,120,627 B2
(45) Date of Patent: Oct. 15, 2024

(54) DATA PROCESSING METHOD FOR NODE LOCALIZATION IN WIRELESS SENSOR NETWORKS

(71) Applicant: Sun Yat-sen University, Guangzhou (CN)

(72) Inventors: Yitong Liu, Guangzhou (CN); Hao Lin, Guangzhou (CN); Xingcheng Liu, Guangzhou (CN); Qiang Tu, Guangzhou (CN); Yi Xie, Guangzhou (CN)

(73) Assignee: Sun Yat-sen University, Guangzhou (CN)

( * ) Notice: Subject to any disclaimer, the term of this patent is extended or adjusted under 35 U.S.C. 154(b) by 0 days.

(21) Appl. No.: 18/530,247

(22) Filed: Dec. 6, 2023

(65) Prior Publication Data

US 2024/0292365 A1     Aug. 29, 2024

Related U.S. Application Data

(63) Continuation of application No. PCT/CN2022/124282, filed on Oct. 10, 2022.

(30) Foreign Application Priority Data

Apr. 7, 2022   (CN) .......................... 202210360751.9

(51) Int. Cl.
*H04W 64/00*       (2009.01)
*H04W 84/18*       (2009.01)

(52) U.S. Cl.
CPC ............ *H04W 64/00* (2013.01); *H04W 84/18* (2013.01)

(58) Field of Classification Search
CPC .............................. H04W 64/00; H04W 84/18
See application file for complete search history.

(56) References Cited

U.S. PATENT DOCUMENTS

| | | | |
|---|---|---|---|
| 9,463,054 B2 | 10/2016 | Mueckter | |
| 9,846,220 B2 | 12/2017 | Kong et al. | |
| 11,327,147 B2 | 5/2022 | Ylamurto et al. | |

FOREIGN PATENT DOCUMENTS

| | | | |
|---|---|---|---|
| CN | 102497666 A | 6/2012 | |
| CN | 103906230 A | 7/2014 | |

(Continued)

OTHER PUBLICATIONS

Internation Search Report of PCT/CN2022/124282, Mailed Dec. 12, 2022.

*Primary Examiner* — Natasha W Cosme
(74) *Attorney, Agent, or Firm* — True Shepherd LLC; Andrew C. Cheng

(57) ABSTRACT

In a data processing method for node localization in wireless sensor networks, a plurality of potential coordinate calculation values for a to-be-located node are calculated based on RSSI data received by the to-be-located node from a plurality of anchor nodes. A centroid $C_1$ of these coordinate calculation values is calculated. Then coordinate calculation values with distances to the centroid $C_1$ less than a threshold are screened out, and a centroid $C_2$ of the screened-out coordinate calculation values is calculated. A coordinate position of the centroid $C_2$ is used as the position of the to-be-located node. In other words, a plurality of potential positions for the to-be-located node are calculated using multiple groups of RSSI data and these potential positions are then screened through calculation. Instead of directly processing the received RSSI data, the present disclosure processes the coordinate calculation values obtained based on the received RSSI data.

8 Claims, 4 Drawing Sheets

(56) References Cited

FOREIGN PATENT DOCUMENTS

| CN | 104168649 | A | 11/2014 |
| CN | 108989984 | A | 12/2018 |
| CN | 112135249 | A | 12/2020 |
| CN | 114745661 | A | 7/2022 |

DATA PROCESSING METHOD FOR NODE LOCALIZATION IN WIRELESS SENSOR NETWORKS

CROSS-REFERENCE TO RELATED APPLICATIONS

This application is a continuation of International Patent Application No. PCT/CN2022/124282 with a filing date of Oct. 10, 2022, designating the United States, now pending, and further claims priority to Chinese Patent Application No. 202210360751.9 with a filing date of Apr. 7, 2022. The content of the aforementioned applications, including any intervening amendments thereto, are incorporated herein by reference.

TECHNICAL FIELD

The present disclosure relates to the technical field of wireless sensor networks, and in particular to a data processing method for node localization in wireless sensor networks.

BACKGROUND

Wireless Sensor Networks (WSNs) are regarded as one of the 21 most impactful technologies of this century and belong to the interdisciplinary frontier of computer science, communication, mathematics, etc. The wireless sensor network is a self-organizing data processing network formed by a plurality of sensor nodes with specific functions deployed in a monitoring area, using methods such as data collection and data transmission. The dense deployment of sensor nodes in the network enables quantitative data collection, data aggregation, and data transfer operations. As a modern intelligent network, the wireless sensor network has been widely applied in various fields such as military, the Internet of Things, environmental monitoring, modern transportation (such as shared bicycles in recent years), convenient express delivery, modern healthcare, industry, and space exploration, with a broad development prospect. In many applications of wireless sensor networks, without corresponding location information, the collected data loses its value. Therefore, the localization technology is one of the hot topics in the research field of wireless sensor networks.

In wireless sensor networks, localization algorithms can be divided into two stages: top-level distance estimation and bottom-level location estimation. The top-level distance estimation method is the main difference between ranging and range-free localization algorithms. Depending on whether it is necessary to directly measure the distance between the transmitter and receiver through hardware means, localization algorithms of the wireless sensor networks can be divided into range-free and range-based types. The core idea of range-based localization algorithms is to calculate a distances between a to-be-located node and anchor nodes using measured physical parameters and determine actual coordinates of the to-be-located node based on the distances between the to-be-located node and the anchor nodes.

In practical application of localization algorithms, various factors can affect the final localization accuracy. One of the more important influencing factors is environmental noise, which leads to deviations between the measured values and actual values of the physical parameters, causing errors in the calculation of distances between the to-be-located node and the anchor nodes. If such noise factors are not handled well, it can result in significant deviations in the final localization results.

Using the traditional received signal strength indicator (RSSI)-trilateration algorithm as an example, the main process involves calculating a distance between a to-be-located node and an anchor node based on the RSSI value of the anchor node received at the to-be-located node. With three such distances, coordinates of the to-be-located node can be calculated using trilateration. However, there is an error in the RSSI signal received at the to-be-located node due to the noise:

$$RSSI_{recieved} = RSSI_{real} + n \quad (1)$$

where $RSSI_{recieved}$ represents a received RSSI value, $RSSI_{real}$ represents a real RSSI value at the position of the to-be-located node, and n represents noise.

Calculating the distance between the to-be-located node and the anchor node based on RSSI reception values with noise can result in a significant distance error, thus affecting the localization accuracy.

To address the impact of environmental factors on received RSSI data, existing solutions involve designing different filtering models to process multiple groups of RSSI data from the same anchor node, to reduce the impact of noise n in Equation (1).

Common filtering methods include mean filtering, mean+ median filtering, Gaussian filtering, etc.

Mean filtering is the most commonly used and simplest filtering method. When K groups of RSSI values are received at the to-be-located node, denoted as $RSSI_i$, $i \in [1, K]$, the calculated value given by the following equation is taken as a basis for calculating the distance between the to-be-located node and the anchor node:

$$RSSI_1 = \frac{1}{K}\sum_{i=1}^{K} RSSI_i \quad (2)$$

If the environmental noise follows a stationary random distribution, according to the law of large numbers, when K is large, this filtering method yields an RSSI calculated value close to the mathematical expectation of this set of RSSI values. However, this assumption is based on two premises: the environmental noise follows an additive Gaussian white distribution, and K is large. In practical environments, noise added to RSSI reception values generally does not follow a stationary distribution due to influences such as shadow fading, multipath propagation, impulse noise, etc. Due to limitations in computation time and storage space, the volume of RSSI data available for processing cannot be very large. Therefore, while mean filtering can reduce the impact of noise under certain conditions, it still has limitations.

The mean+median filtering method considers the influence of occasional impulse noise. The calculated value given by the following equation is taken as a basis for calculating the distance between the to-be-located node and the anchor node:

$$RSSI_2 = \frac{1}{2}\left(\sum_{i=1}^{K} RSSI_i + R\dot{S}SI\right) \quad (3)$$

where $R\dot{S}SI$ is the median of the K groups of RSSI values. This method introduces the median of data on the basis of mean filtering, reducing the impact of occasional large noise values. However, while this method decreases the influence of noise, it still retains noise in the calculated data, introducing inevitable errors.

The Gaussian filtering method determines the mean and variance of the Gaussian filtering model to be fit, thus solving the density function $f(RSSI)$:

$$\mu = \frac{1}{K}\sum_{i=1}^{K} RSSI_i \qquad (4)$$

$$\delta^2 = \frac{1}{K-1}\sum_{i=1}^{K}(RSSI_i - \mu) \qquad (5)$$

$$f(RSSI) = \frac{1}{\sigma\sqrt{2\pi}}e^{-\frac{(RSSI-\mu)^2}{2\delta^2}} \qquad (6)$$

An effective range of RSSI is determined according to Equations (4), (5), and (6), and an average value of the selected RSSI values after filtering is taken as the basis for calculation. Although Gaussian filtering can effectively screen out data deviating from the true values, it cannot eliminate data fluctuations.

In summary, various noises in real environments can contaminate the RSSI data received at the to-be-located node. The traditional filtering methods can reduce the impact of noises but cannot eliminate it. Moreover, since multiple groups of are required, it causes significant time consumption and space overhead.

An RSSI-based arc trilateration method for wireless sensor network is disclosed in the prior art. The method includes the following steps: S10, establishing an indoor localization layout model based on an arc trilateration layout, and arranging a plurality of beacon nodes on the indoor localization layout model; S20, initializing the indoor localization layout model and localization information of the beacon nodes; S30, continuously receiving a plurality of RSSI signals from a node under test, filtering the RSSI signals through a Kalman filter, selecting three RSSI signals with maximum values, and calculating three test distances corresponding to the three RSSI signals using a path loss model to determine a spatial range of the node under test; and S40, calculating predicted coordinates of the node under test using a particle swarm algorithm. In this patent, the RSSI signals are filtered using a Kalman filter and then three RSSI signals with maximum values are selected for localization. Filtering can only eliminate predictable noise effects and cannot eliminate unpredictable noise. Therefore, localization relying on RSSI data with noise will result in localization errors for the to-be-located node, affecting localization accuracy. Additionally, filtering requires a large volume of RSSI data, leading to significant time consumption and space overhead.

SUMMARY OF PRESENT INVENTION

An objective of the present disclosure is to provide a data processing method for node localization in wireless sensor networks with high accuracy, low time consumption, and small space overhead.

To achieve the above objective, the present disclosure provides a data processing method for node localization in wireless sensor networks, including the following steps:

S1: obtaining RSSI data received by a to-be-located node from n anchor nodes, where m groups of RSSI data are collected for each anchor node, and n≥3.

S2: calculating distances between the to-be-located node and the anchor nodes based on the RSSI data.

S3: calculating coordinates of the to-be-located node based on coordinates of the anchor nodes and the distances between the to-be-located node and the anchor nodes; and obtaining a plurality of coordinate calculation values for the to-be-located node through permutations and combinations of the m groups of RSSI data of each of the n anchor nodes.

S4: calculating a centroid $C_1$ of the plurality of coordinate calculation values for the to-be-located node obtained in step S3.

S5: screening out coordinate calculation values with distances to the centroid $C_1$ less than a threshold from the plurality of coordinate calculation values for the to-be-located node obtained in step S3.

S6: calculating a centroid $C_2$ of the coordinate calculation values of the to-be-located node screened out in step S5, and using a coordinate position of the centroid $C_2$ as a position of the to-be-located node.

In one embodiment, coordinates of the to-be-located node are calculated using a ranging localization method in step S3.

In one embodiment, the coordinates of the to-be-located node are calculated based on trilateration in step S3, to obtain $C_n^3 A_m^1 A_m^1 A_m^1$ coordinate calculation values for the to-be-located node.

In one embodiment, n=3, and m=10.

In one embodiment, when the number of the coordinate calculation values for the to-be-located node in step S3 is k, the coordinate calculation values for the to-be-located node are $O_i=(x_i, y_i)$, where i=1, 2, 3, . . . , k.

In step S5, when the centroid $C_1=(x_{C1}, y_{C1})$, then:

$$x_{C1} = \frac{1}{k}\sum_{1}^{k} x_i;$$

$$y_{C1} = \frac{1}{k}\sum_{1}^{k} y_i.$$

In one embodiment, the threshold in step S5 is less than half of a distance between two furthest apart coordinate calculation values among the plurality of coordinate calculation values for the to-be-located node obtained in step S3.

In one embodiment, the threshold is a quarter of the distance between the two furthest apart coordinate calculation values among the plurality of coordinate calculation values for the to-be-located node obtained in step S3, where the threshold is denoted by r:

$$r = \frac{1}{4}\max\left\{\sqrt{(x_s - x_j)^2 + (y_s - y_j)^2}\right\}, \ s, j \in [1, k].$$

In one embodiment, t coordinate calculation values for the to-be-located node are screened out in step S5, and the coordinate calculation values for the to-be-located node are $O_i=(x_i, y_i)$, where i=1, 2, 3, . . . , t.

In step S7, when the centroid $C_2=(x_{C2}, y_{C2})$, then:

$$x_{C2} = \frac{1}{t}\sum_1^t x_i;$$

$$y_{C2} = \frac{1}{t}\sum_1^t y_i.$$

In one embodiment, a time interval between adjacent RSSI data collections for a certain anchor node is 10 seconds or more in step S1.

In one embodiment, the anchor nodes are wireless beacon nodes.

Compared with the prior art, the present disclosure has the following beneficial effects:

In the present disclosure, a plurality of potential coordinate calculation values for a to-be-located node are calculated based on RSSI data received by the to-be-located node from a plurality of anchor nodes. A centroid $C_1$ of these coordinate calculation values is calculated. Then coordinate calculation values with distances to the centroid $C_1$ less than a threshold are screened out, and a centroid $C_2$ of the screened-out coordinate calculation values is calculated. A coordinate position of the centroid $C_2$ is used as the position of the to-be-located node. In other words, a plurality of potential positions for the to-be-located node are calculated using multiple groups of RSSI data and these potential positions are then screened through calculation. Instead of directly processing the received RSSI data, the present disclosure processes the coordinate calculation values that are calculated based on the received RSSI data, offering improved precision, simplicity in computation, and reduced time and space overheads.

DETAILED DESCRIPTION OF THE EMBODIMENTS

The specific implementations of the present disclosure are described in more detail below with reference to the accompanying drawings and embodiments. The following embodiments are intended to illustrate the present disclosure, but not to limit the scope of the present disclosure.

Embodiment 1

Figure 1:
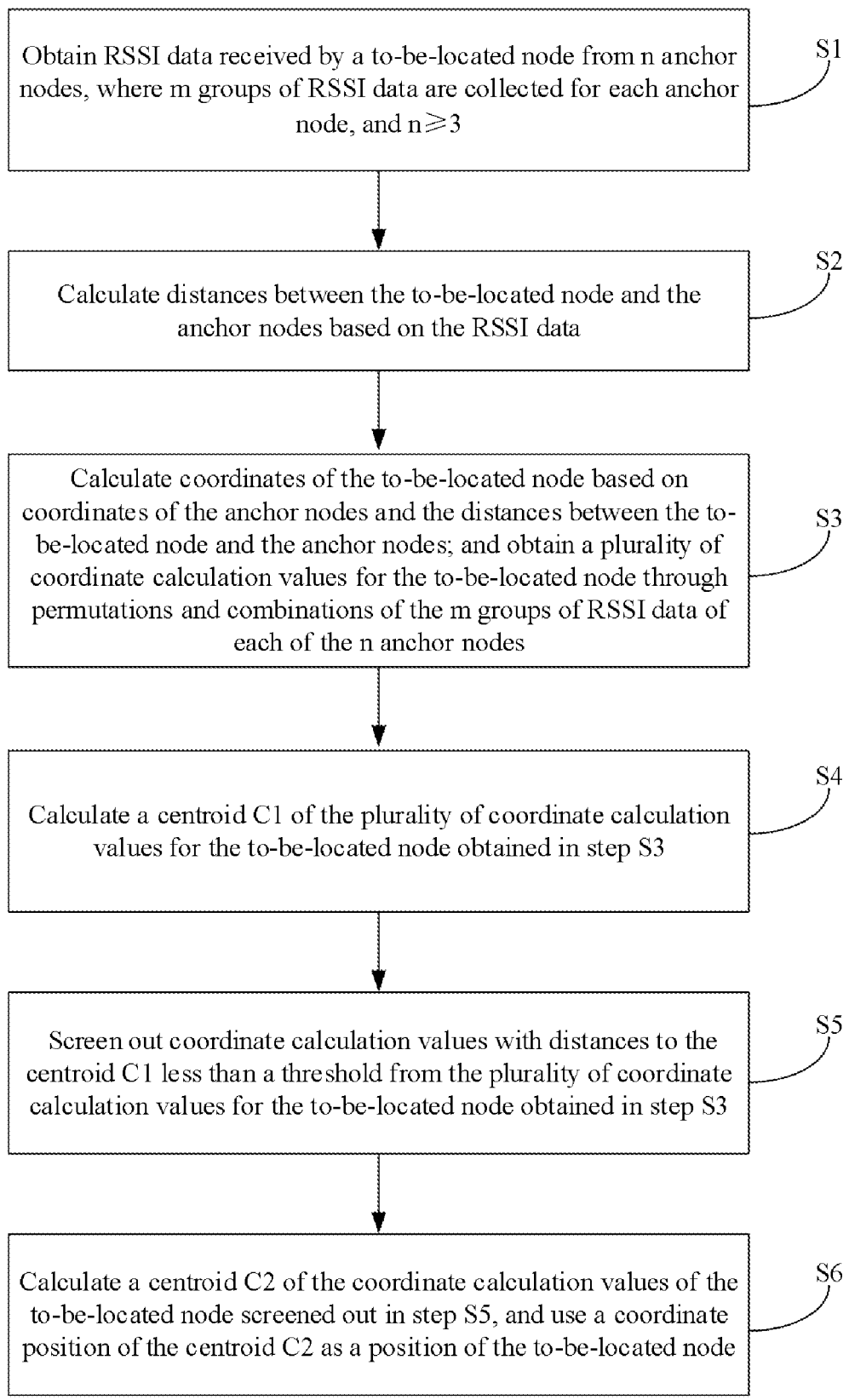
FIG. 1 is a flowchart showing a data processing method according to an embodiment of the present disclosure.

As shown in FIG. 1, an exemplary embodiment of the present disclosure provides a data processing method for node localization in wireless sensor networks, including the following steps:

In step S1, RSSI data received by a to-be-located node from n anchor nodes is obtained, where m groups of RSSI data are collected for each anchor node, and n≥3.

In step S2, distances between the to-be-located node and the anchor nodes are calculated based on the RSSI data.

In step S3, coordinates of the to-be-located node are calculated based on coordinates of the anchor nodes and the distances between the to-be-located node and the anchor nodes; and a plurality of coordinate calculation values for the to-be-located node are obtained through permutations and combinations of the m groups of RSSI data of each of the n anchor nodes.

In step S4, a centroid $C_1$ of the plurality of coordinate calculation values for the to-be-located node obtained in step S3 is calculated.

In step S5, coordinate calculation values with distances to the centroid $C_1$ less than a threshold are screened out from the plurality of coordinate calculation values for the to-be-located node obtained in step S3.

In step S6, a centroid $C_2$ of the coordinate calculation values of the to-be-located node screened out in step S5 is calculated, and a coordinate position of the centroid $C_2$ is used as a position of the to-be-located node.

In this embodiment, a plurality of potential coordinate calculation values for a to-be-located node are calculated based on RSSI data received by the to-be-located node from a plurality of anchor nodes. A centroid $C_1$ of these coordinate calculation values is calculated. Then coordinate calculation values with distances to the centroid $C_1$ less than a threshold are screened out, and a centroid $C_2$ of the screened-out coordinate calculation values is calculated. A coordinate position of the centroid $C_2$ is used as the position of the to-be-located node. In other words, a plurality of potential positions for the to-be-located node are calculated using multiple groups of RSSI data and these potential positions are then screened through calculation. Instead of directly processing the received RSSI data, the present disclosure processes the coordinate calculation values that are calculated based on the received RSSI data, offering improved precision, simplicity in computation, and reduced time and space overheads. In this embodiment, a plurality of coordinate calculation values for the to-be-located node is calculated based on received RSSI data. These coordinate calculation values represent potential positions of the to-be-located node. A location range of the to-be-located node is determined based on these coordinate calculation values. Then, the centroid $C_1$ of these coordinate calculation values is determined, and coordinate calculation values with distances to the centroid $C_1$ less than a threshold are screened out, further narrowing down the range. The position of the centroid $C_2$ of the screened-out coordinate calculation values is then used as the position of the to-be-located node. This approach ensures that the calculated position of the to-be-located node has minimal error compared to the actual position of the to-be-located node. In this embodiment, there is no need to filter the RSSI data, and a minimal volume of RSSI data is required, resulting in reduced time consumption and space overhead.

In step S3, through permutations and combinations of m groups of RSSI data from each of the n anchor nodes, a plurality of coordinate calculation values for the to-be-located node are obtained. This involves selecting one set of RSSI data from the m groups of RSSI data obtained for one anchor node and pairing the selected set of RSSI data with one set of RSSI data selected from the m groups of RSSI data of another anchor node. The coordinate calculation value of the to-be-located node is then calculated, and this process is repeated until all coordinate calculation values for the to-be-located node are calculated based on the obtained RSSI data. For example, there are four anchor nodes, and three groups of RSSI data are connected for each anchor node. Moreover, the coordinate calculation values of the to-be-located node are calculated using trilateration. In this case, three anchor nodes are selected from the four anchor nodes, and one set of RSSI data is selected from the three groups of RSSI data of one of the selected anchor nodes, to pair with one set of RSSI data of each of the other two anchor nodes for calculation. The total number of the coordinate calculation values for the to-be-located node is $C_n^3 A_m^1 A_m^1 A_m^1$. Therefore, in this embodiment, all potential positions for the to-be-located node are calculated based on the RSSI data from the anchor nodes, and these potential positions are screened through calculation.

Embodiment 2

This embodiment differs from Embodiment 1 in that, on the basis of Embodiment 1, this embodiment further illustrates step S3 and step S6.

In this embodiment, in step S3, coordinates of the to-be-located node are calculated using a ranging localization method. In other words, the coordinates of the to-be-located node are calculated based on the distances from the anchor nodes to the to-be-located node. Specifically, in this embodiment, the coordinates of the to-be-located node are calculated based on a trilateration localization method, to obtain $C_n^3 A_m^1 A_m^1 A_m^1$ coordinate calculation values for the to-be-located node. Optionally, in this embodiment, n=3, and m=10. In other words, in this embodiment, RSSI data of three anchor nodes is obtained. 10 groups of RSSI data are obtained for each anchor node, thus obtaining $10^3$ coordinate calculation values for the to-be-located node.

In addition, in this embodiment, the centroid $C_1$ is calculated in the following manner in step S3:

If the number of the coordinate calculation values for the to-be-located node is k, the coordinate calculation values for the to-be-located node are $O_i=(x_i,y_i)$, where i=1, 2, 3, . . . , k.

In step S4, when the centroid $C_1=(x_{C1}, y_{C1})$, then:

$$x_{C1} = \frac{1}{k}\sum_1^k x_i;$$

$$y_{C1} = \frac{1}{k}\sum_1^k y_i.$$

In this embodiment, $k=C_n^3 A_m^1 A_m^1 A_m^1=C_3^3 A_{10}^1 A_{10}^1 A_{10}^1=10^3$.

In addition, in this embodiment, the centroid $C_2$ is calculated in the following manner in step S7:

In step S5, t coordinate calculation values for the to-be-located node are screened out, and the coordinate calculation values for the to-be-located node are $O_i=(x_i, y_i)$, where i=1, 2, 3, . . . , t. t is a number less than k.

In step S6, when the centroid $C_2=(x_{C2}, y_{C2})$, then:

$$x_{C2} = \frac{1}{t}\sum_1^t x_i;$$

$$y_{C2} = \frac{1}{t}\sum_1^t y_i.$$

Other steps of this embodiment are the same as those of Embodiment 1, and will not be repeated herein.

Embodiment 3

This embodiment differs from Embodiment 2 in that, on the basis of Embodiment 2, this embodiment further illustrates step S5.

In this embodiment, in step S5, the threshold is less than half a distance between two furthest apart coordinate calculation values among the plurality of coordinate calculation values for the to-be-located node obtained in step S3. To ensure localization accuracy, the selection of the threshold, which serves as the basis for filtering the coordinate calculation values, is crucial. If the threshold is excessively large, the impact of noise is not significantly reduced. If the threshold is excessively small, it may result in a large error in the second centroid calculation, introducing new inaccuracies.

Specifically, in this embodiment, the threshold is a quarter of the distance between the two furthest apart coordinate calculation values among the plurality of coordinate calculation values for the to-be-located node obtained in step S3, where the threshold is denoted by r:

$$r = \frac{1}{4}\max\left\{\sqrt{(x_s - x_j)^2 + (y_s - y_j)^2}\right\}, \ s, j \in [1, k].$$

The selection of the above threshold can effectively improve localization accuracy while also considering computational simplicity.

Other aspects of this embodiment are the same as those of Embodiment 2, and will not be repeated herein.

Embodiment 4

This embodiment differs from Embodiment 3 in that, on the basis of Embodiment 3, this embodiment involves simulation experiments for the data processing method.

In this embodiment, in step S1, a time interval between adjacent RSSI data collections for a certain anchor node is 10 seconds or more. This ensures that the collected RSSI data has a temporal aspect, avoiding sporadic accidental noise.

Optionally, the anchor nodes are Bluetooth beacon nodes, characterized by low power consumption, long standby time, and the ability to continuously broadcast without interruption. This enables the reception of periodic groups of RSSI data.

Other aspects of this embodiment are the same as those of Embodiment 3, and will not be repeated herein.

Embodiment 5

This embodiment differs from Embodiment 4 in that, on the basis of Embodiment 4, this embodiment involves physical inspection for the data processing method.

In this embodiment, the computer configuration for the experimental environment is as follows: CPU: Core™ i7-8700K; RAM: 16 GB; operating system: Windows 10; programming: Matlab. The specific experimental parameters are set as follows: three anchor nodes and one to-be-located node are established. To compare various data processing methods, calculation is performed based on ten groups of RSSI data received by the to-be-located node from each of the three anchor nodes. To simulate RSSI values affected by noise in an actual environment, a burst noise and additive Gaussian white noise with SNR=1 dB are introduced.

The burst noise is set as follows:

$$noise = \begin{cases} a+b, r \text{ and } 1 < \frac{1}{8} \text{ and } r \text{ and } 2 < \frac{1}{5} \\ a, r \text{ and } 1 < \frac{1}{8} \text{ and } r \text{ and } 2 < \frac{1}{5} \\ b, r \text{ and } 1 < \frac{1}{8} \text{ and } r \text{ and } 2 < \frac{1}{5} \\ 0, r \text{ and } 1 < \frac{1}{8} \text{ and } r \text{ and } 2 < \frac{1}{5} \end{cases}$$

wherein a represents significant disturbance noise with an amplitude set at 10% of the RSSI value, and b represents minor disturbance noise with an amplitude set at 3% of the RSSI value.

Figure 2:
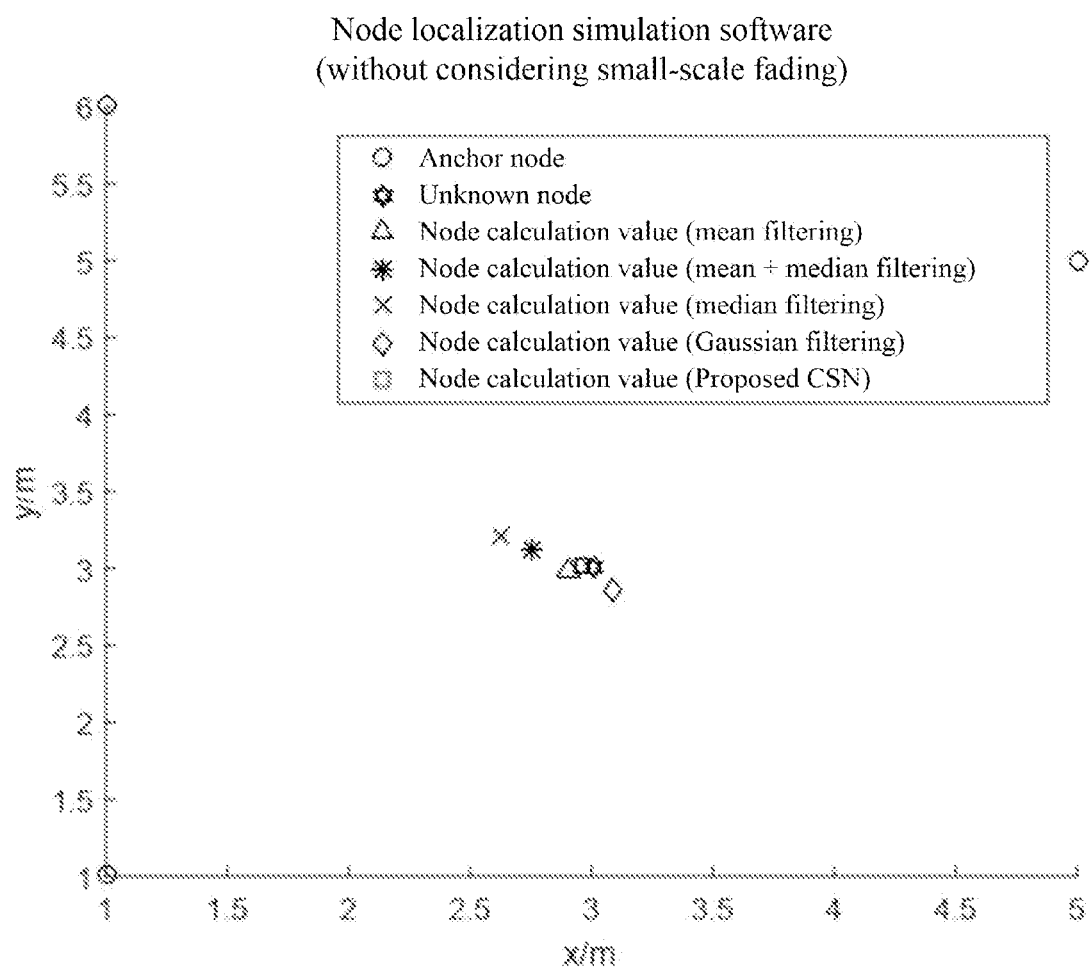
FIG. 2 is a schematic diagram illustrating the distribution of anchor nodes and a to-be-located node in a simulation experiment according to an embodiment of the present disclosure, and the distribution of the to-be-located node obtained by various data processing methods.

In the simulation experiment of this embodiment, the to-be-located node and the three anchor nodes are fixed, and the signal-to-noise ratio is SNR=1 d B. As shown in FIG. 2, FIG. 2 illustrates the distribution of the to-be-located node and three anchor nodes in the simulation experiment of this embodiment, the positional distribution of the to-be-located node obtained through direct localization, mean filtering, mean+median filtering, and the distribution of the centroids $C_1$ and $C_2$ obtained through the data processing method according to the embodiments of the present disclosure. Direct localization refers to determining the position of the to-be-located node based on received and unprocessed RSSI data. From FIG. 2, it can be observed that the centroid $C_2$ is closer to the actual position of the to-be-located node compared to other data processing methods.

Figure 3:
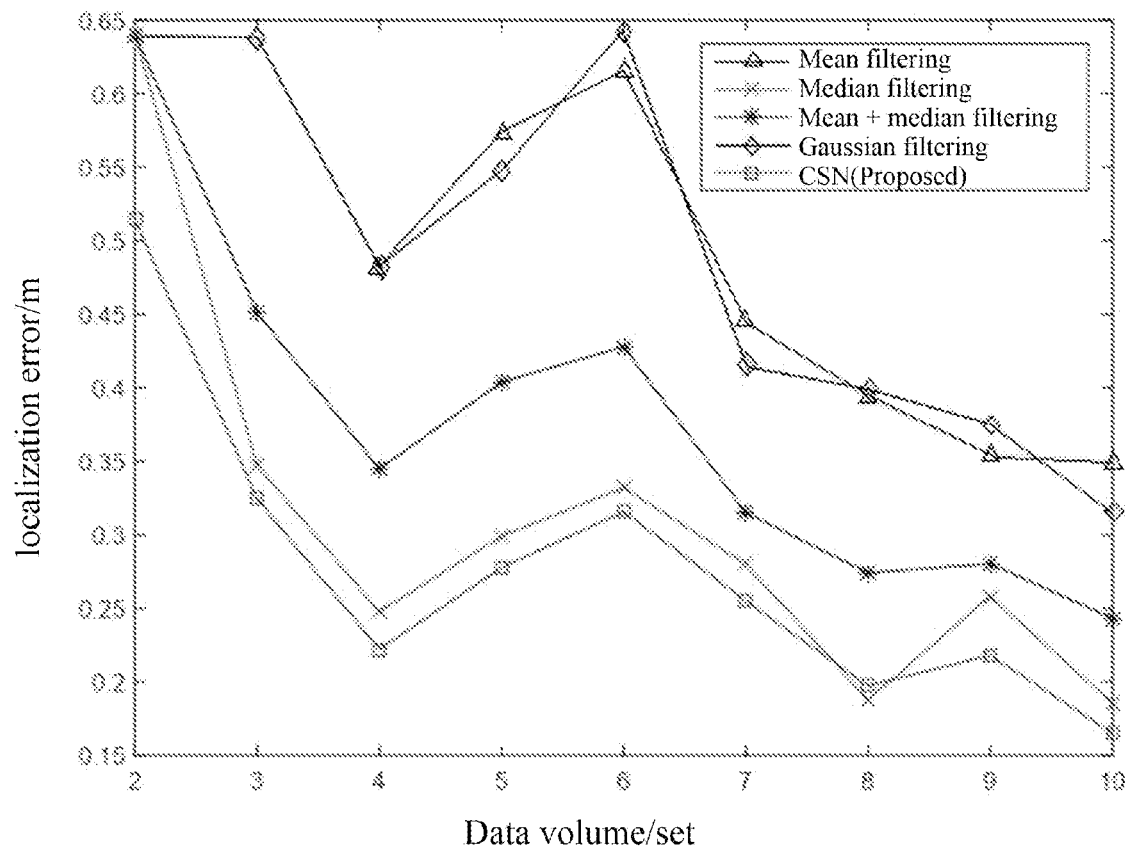
FIG. 3 represents localization errors of various data processing methods as a signal-to-noise ratio changes according to an embodiment of the present disclosure.
Figure 4:
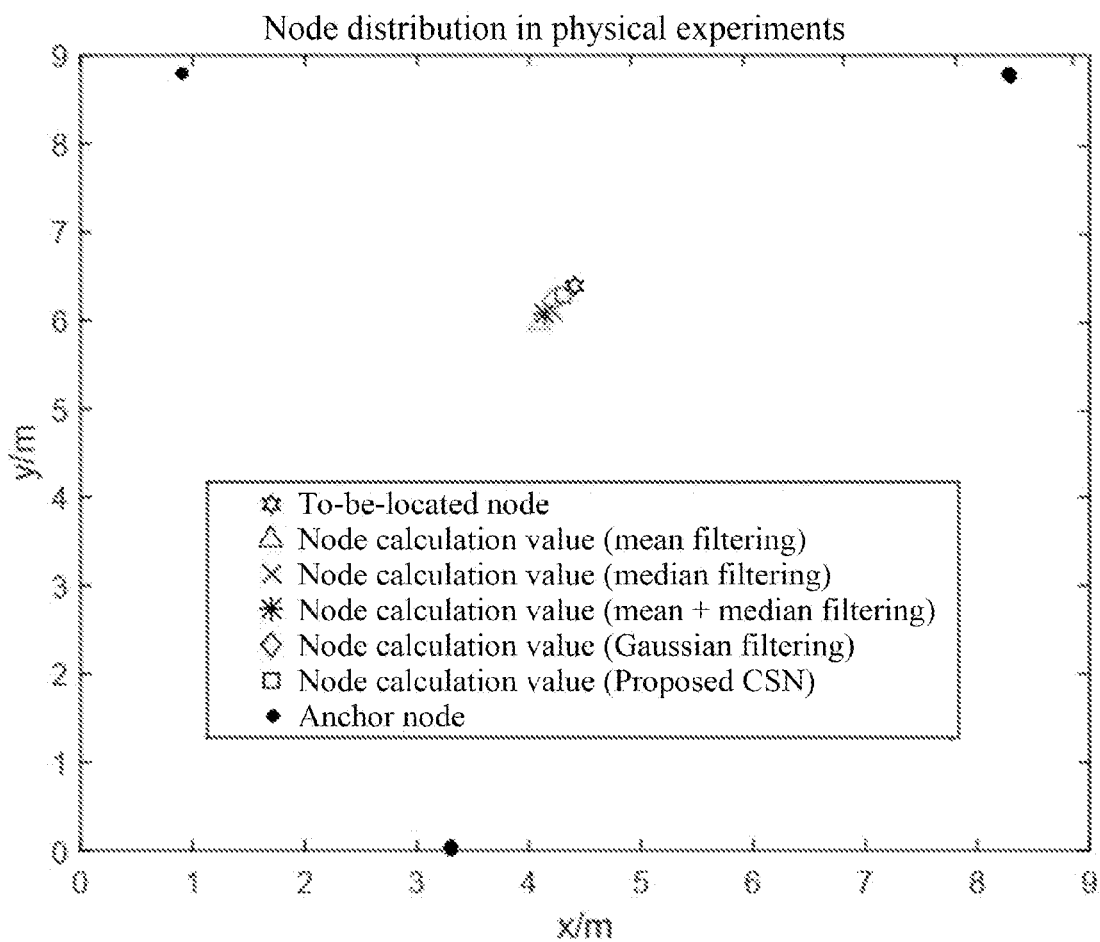
FIG. 4 is a schematic diagram illustrating the distribution of anchor nodes and a to-be-located node in a physical inspection according to an embodiment of the present disclosure, and the distribution of the to-be-located node obtained by various data processing methods.

As shown in FIG. 3, FIG. 3 presents errors of the position of the to-be-located node obtained by mean filtering, the position of the to-be-located node obtained by mean+median filtering, the centroid $C_1$, and the centroid $C_2$ compared to the actual position of the to-be-located node under different signal-to-noise ratio conditions. FIG. 4 illustrates the average errors of each method running 10 times. From FIG. 3, it can be seen that except for some signal-to-noise ratio conditions where the centroid $C_2$ calculated after filtering is slightly inferior to the result obtained by mean+median filtering, in most cases, the method of the present disclosure outperforms mean filtering and mean+median filtering while requiring a smaller volume of node RSSI data. Thus, the data processing method in the embodiment of the present disclosure shows advantages in localization accuracy compared to existing technologies.

Other aspects of this embodiment are the same as those of Embodiment 4, and will not be repeated herein.

Embodiment 6

This embodiment differs from Embodiment 5 in that, on the basis of Embodiment 4, this embodiment involves physical inspection for the data processing method.

In this embodiment, beacon nodes equipped with nRF52810/CC2640 R2F Bluetooth chips (with a Bluetooth version BLE4.2 and a receiving sensitivity of −96 dBm) are utilized for actual node localization in a real environment. In the laboratory setup, the Bluetooth beacon nodes serve as anchor nodes, and a mobile phone acts as a to-be-located node. RSSI data from each anchor node is received by software on the mobile phone corresponding to the Bluetooth beacon node. 10 groups of RSSI data are received and recorded for each anchor node, and RSSI data is refreshed at 10-second intervals.

During processing of the received RSSI data, a coordinate system is established in Matlab based on the positions of the Bluetooth beacon nodes and the mobile phone. The data is processed using mean filtering, median filtering, mean+median filtering, and the method proposed in the embodiment of the present disclosure, and traditional RSSI-triangulation is used to calculate node coordinates. The differences in localization accuracy resulting from different data processing methods are compared.

As shown in FIG. 4, FIG. 4 illustrates the actual positions of the to-be-located node and three anchor nodes, along with the positional distribution of the to-be-located node obtained through mean filtering, median filtering, mean+median filtering, and the method proposed in the embodiment of the present disclosure. It is evident that the coordinates of the to-be-located node calculated using the method proposed in the embodiment of the present disclosure are closer to the actual position of the to-be-located node compared to the coordinates obtained using traditional filtering methods. The error for mean filtering is 0.5138 m; for median filtering, the error is 0.3530 m; for mean+median filtering, the error is 0.4051 m; and for the method in the embodiment of the present disclosure, the error is 0.1516 m. Thus, the physical inspection also confirms that the method proposed in the embodiment of the present disclosure exhibits significant advantages in localization accuracy.

Other aspects of this embodiment are the same as those of Embodiment 4, and will not be repeated herein.

In conclusion, the embodiments of the present disclosure provide a data processing method for node localization in wireless sensor networks. A plurality of potential coordinate calculation values for a to-be-located node are calculated based on RSSI data received by the to-be-located node from a plurality of anchor nodes. A centroid $C_1$ of these coordinate calculation values is calculated. Then coordinate calculation values with distances to the centroid $C_1$ less than a threshold are screened out, and a centroid $C_2$ of the screened-out coordinate calculation values is calculated. A coordinate position of the centroid $C_2$ is used as the position of the to-be-located node. In other words, a plurality of potential positions for the to-be-located node are calculated using multiple groups of RSSI data and these potential positions are then screened through calculation. Instead of directly processing the received RSSI data, the present disclosure processes the coordinate calculation values that are calculated based on the received RSSI data, offering improved precision, simplicity in computation, and reduced time and space overheads.

The foregoing are merely descriptions of the preferred embodiments of the present disclosure. It should be noted that several improvements and replacements can be made by a person of ordinary skill in the art without departing from the technical principle of the present disclosure, and these improvements and replacements shall also be deemed as falling within the protection scope of the present disclosure.

What is claimed is:

1. A data processing method for node localization in wireless sensor networks, comprising the following steps:
    S1: obtaining received signal strength indicator (RSSI) data received by a to-be-located node from n anchor nodes, wherein m groups of RSSI data are collected for each anchor node, and n≥3;
    S2: calculating distances between the to-be-located node and the anchor nodes based on the RSSI data;

S3: calculating coordinates of the to-be-located node based on coordinates of the anchor nodes and the distances between the to-be-located node and the anchor nodes;

and obtaining a plurality of coordinate calculation values for the to-be-located node through permutations and combinations of the m groups of RSSI data of each of the n anchor nodes;

S4: calculating a centroid $C_1$ of the plurality of coordinate calculation values for the to-be-located node obtained in step S3;

S5: screening out coordinate calculation values with distances to the centroid $C_1$ less than a threshold from the plurality of coordinate calculation values for the to-be-located node obtained in step S3, wherein the threshold is less than half of a distance between two furthest apart coordinate calculation values among the plurality of coordinate calculation values for the to-be-located node obtained in step S3, wherein the threshold is denoted by r:

$$r = \frac{1}{4}\max\left\{\sqrt{(x_s - x_j)^2 + (y_s - y_j)^2}\right\}, \ s, j \in [1, k];$$

and

S6: calculating a centroid $C_2$ of the coordinate calculation values screened out in step S5, and using a coordinate position of the centroid $C_2$ as a position of the to-be-located node.

2. The data processing method according to claim 1, wherein the coordinates of the to-be-located node are calculated using a ranging localization method in step S3.

3. The data processing method according to claim 2, wherein the coordinates of the to-be-located node are calculated based on trilateration in step S3, to obtain $C_n^3 A_m^1 A_m^1 A_m^1$ coordinate calculation values for the to-be-located node.

4. The data processing method according to claim 3, wherein n=3, and m=10.

5. The data processing method according to claim 1, wherein in step S3, when a number of the coordinate calculation values for the to-be-located node is k, the coordinate calculation values for the to-be-located node are $O_i=(x_i,y_i)$, wherein i=1, 2, 3, . . . , k; and in step S4, when the centroid $C_1=(x_{C1}, y_{C1})$, then:

$$x_{C1} = \frac{1}{k}\sum_1^k x_i;$$
$$y_{C1} = \frac{1}{k}\sum_1^k y_i.$$

6. The data processing method according to claim 1, wherein in step S5, t coordinate calculation values for the to-be-located node are screened out, and the coordinate calculation values for the to-be-located node are $O_i=(x_i,y_i)$, wherein i=1, 2, 3, . . . , t; and in step S7, when the centroid $C_2=(x_{C2}, y_{C2})$, then:

$$x_{C2} = \frac{1}{t}\sum_1^t x_i;$$
$$y_{C2} = \frac{1}{t}\sum_1^t y_i.$$

7. The data processing method according to claim 1, wherein in step S1, a time interval between adjacent RSSI data collections for each of the anchor nodes is 10 seconds or more.

8. The data processing method according to claim 1, wherein the anchor nodes are wireless beacon nodes.

* * * * *